United States Patent
Aghili et al.

(10) Patent No.: US 12,507,155 B2
(45) Date of Patent: Dec. 23, 2025

(54) ENHANCEMENTS TO NON-ACCESS STRATUM (NAS) PROTOCOL TO TRANSMIT SMALL DATA OVER SIGNALING PLANE

(71) Applicant: INTERDIGITAL PATENT HOLDINGS, INC., Wilmington, DE (US)

(72) Inventors: Behrouz Aghili, Commack, NY (US); Saad Ahmad, Montreal (CA); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/066,608

(22) PCT Filed: Jan. 5, 2017

(86) PCT No.: PCT/US2017/012247
§ 371 (c)(1),
(2) Date: Jun. 27, 2018

(87) PCT Pub. No.: WO2017/120278
PCT Pub. Date: Jul. 13, 2017

(65) Prior Publication Data
US 2019/0014530 A1    Jan. 10, 2019

Related U.S. Application Data

(60) Provisional application No. 62/292,980, filed on Feb. 9, 2016, provisional application No. 62/279,363, filed
(Continued)

(51) Int. Cl.
H04W 48/08    (2009.01)
H04L 1/00    (2006.01)
(Continued)

(52) U.S. Cl.
CPC .......... *H04W 48/08* (2013.01); *H04L 1/0002* (2013.01); *H04W 28/12* (2013.01); *H04W 80/06* (2013.01); *H04W 92/10* (2013.01)

(58) Field of Classification Search
USPC ....................................................... 370/235
See application file for complete search history.

(56) References Cited

U.S. PATENT DOCUMENTS 9,398,555 B2    7/2016    Watfa et al.
9,560,516 B2 *    1/2017    Aalla ...................... H04W 8/08
(Continued)

FOREIGN PATENT DOCUMENTS

| EP | 2509345 A1 | 10/2012 |
|---|---|---|
| EP | 2911443 A1 | 8/2015 |
| EP | 2961212 A1 | 12/2015 |

OTHER PUBLICATIONS

3rd Generation Partnership Project (3GPP), C1-163334, "Alignment on Control Plane Service Request Related Usage", Nokia, Alcatel-Lucent Shanghai Bell, 3GPP TSG-CT WG1 Meeting #99, Tenerife, Santa Cruz, Jul. 25-29, 2016, 11 pages.
(Continued)

*Primary Examiner* — Ayman A Abaza
*Assistant Examiner* — Hooman Houshmand
(74) *Attorney, Agent, or Firm* — Condo Roccia Koptiw LLP

(57) ABSTRACT

Enhancements to a Non-Access Stratum (NAS) Protocol may be provided, for example, to transmit user data over a signaling plane. A wireless transmit receive unit (WTRU) may send a first NAS message to a network device that may include a request to send user data via a control plane. The network device may establish the control plane for the WTRU. The control plane may be established without establishing a user plane connection. The network device may determine a maximum transmission rate for the WTRU
(Continued)

to send user data via the control plane. The network device may send a second NAS message to the WTRU. The second NAS message may indicate that the control plane has been established for the WTRU and the maximum transmission rate.

19 Claims, 8 Drawing Sheets

Related U.S. Application Data on Jan. 15, 2016, provisional application No. 62/275,085, filed on Jan. 5, 2016.

(51) Int. Cl.
*H04W 28/12* (2009.01)
*H04W 80/06* (2009.01)
*H04W 92/10* (2009.01)

(56) References Cited

U.S. PATENT DOCUMENTS

| | | | | |
|---|---|---|---|---|
| 10,805,830 | B2* | 10/2020 | Rönneke | H04W 28/0289 |
| 2012/0108250 | A1* | 5/2012 | Ahn | H04W 28/22 |
| | | | | 455/450 |
| 2012/0281566 | A1* | 11/2012 | Pelletier | H04W 72/1221 |
| | | | | 370/252 |
| 2012/0294236 | A1* | 11/2012 | Watfa | H04W 76/10 |
| | | | | 370/328 |
| 2013/0051338 | A1* | 2/2013 | Ryu | H04W 4/70 |
| | | | | 370/329 |
| 2013/0100895 | A1* | 4/2013 | Aghili | H04W 4/00 |
| | | | | 370/329 |
| 2014/0334418 | A1* | 11/2014 | Urie | H04W 76/12 |
| | | | | 370/329 |
| 2015/0023252 | A1* | 1/2015 | Aalla | H04W 8/08 |
| | | | | 370/328 |
| 2015/0282175 | A1 | 10/2015 | Dai et al. | |
| 2017/0048746 | A1* | 2/2017 | Rönneke | H04W 28/0289 |
| 2017/0245315 | A1* | 8/2017 | Watfa | H04W 72/121 |

OTHER PUBLICATIONS

3rd Generation Partnership Project (3GPP), TR 23.720, "Study on Architecture Enhancements for Cellular Internet of Things (Release 13)", Nov. 2015.

3rd Generation Partnership Project (3GPP), TR 23.887 V2.0.0, "Study of Machine-Type and Other Mobile Data Applications, Communications Enhancements (Release 12)", Dec. 2013, 21 pages.

3rd Generation Partnership Project (3GPP), TR 23.887 V12.0.0, "Technical Specification Group Services and System Aspects, Study on Machine-Type Communication (MTC) and other Mobile Data Applications Communications Enhancements (Release 12)", Dec. 2013, pp. 1-151.

3rd Generation Partnership Project (3GPP), TS 24.301 V13.4.0, "Technical Specification Group Core Network and Terminals, Non-Access-Stratum (NAS) Protocol for Evolved Packet Systems (EPS), Stage 3, Release 13", Dec. 2015, pp. 1-401.

3rd Generation Partnership Project (3GPP), S2-153111, "Authorization of Efficient Small Data Usage", Ericsson, Verizon UK Ltd., TeliaSonera, SA WG2 Meeting #111, Chengdu, P.R. China, Oct. 19-23, 2015, pp. 1-4.

3rd Generation Partnership Project (3GPP), S2-154111, "Standalone Attach Procedure for NB-IoT", Vodafone, SA WG2 Meeting #112, Anaheim, USA, Nov. 16-20, 2015, 12 pages.

* cited by examiner

ENHANCEMENTS TO NON-ACCESS STRATUM (NAS) PROTOCOL TO TRANSMIT SMALL DATA OVER SIGNALING PLANE

CROSS REFERENCE TO RELATED APPLICATIONS

This application is the National Stage entry under 35 U.S.C. § 371 of Patent Cooperation Treaty Application PCT/US2017/012247, which was filed Jan. 5, 2017, which claims the benefit of U.S. Provisional Patent Application No. 62/275,085, filed Jan. 5, 2016; U.S. Provisional Patent Application No. 62/279,363, filed Jan. 15, 2016; and U.S. Provisional Patent Application No. 62/292,980, filed Feb. 9, 2016; the contents of which are incorporated by reference herein.

BACKGROUND

A wireless transmit receive unit (WTRU), such as a cellular user equipment (UE), may communicate over a cellular, e.g., Long Term Evolution (LTE), network.

SUMMARY

Systems, methods, and instrumentalities are disclosed for enhancements to NAS Protocol to transmit small data (e.g., user data) over a signaling plane, which may be applicable, for example, to Machine-Type Communications (MTC), Cellular Internet of Things (CIoT), Narrow Band Internet of Things (NB-IoT), etc.

A wireless transmit receive unit (WTRU) may send a first NAS message to a network device. The first NAS message may be a service request message. The first NAS message may be a tracking area update message. The network device may be a mobility management entity (MME). The first NAS message may include a request to send user data via a control plane. The request may be indicated via an active flag included in the first NAS message. The network device may establish the control plane for the WTRU. The control plane may be established without establishing a user plane connection. The control plane may be maintained after a tracking area update is performed. The network device may determine a maximum transmission rate for the WTRU to send user data via the control plane. The maximum transmission rate may be determined based on one or more of information received from the WTRU or network conditions. The maximum transmission rate may be determined dynamically as the network conditions change. The maximum transmission rate may indicate a maximum number of messages that the WTRU can send via the control plane during a determined period of time.

The network device may send a second NAS message to the WTRU. The second NAS message may indicate that the control plane has been established for the WTRU. The second NAS message may indicate the maximum transmission rate. The second NAS message may indicate that the WTRU can send one or more of internet protocol (IP) packets, non-IP packets, or short message service (SMS) messages over the control plane. The WTRU may send user data to the network device via the control plane. The network device may send the user data to a packet gateway (PGW). The network device may send, to the WTRU, an acknowledgment (ACK) message (e.g., an ACK NAS message). The ACK message may include one or more sequence numbers associated with the sent user data. The WTRU may determine that sending user data will exceed the maximum transmission rate (e.g., the user data may exceed the maximum number of messages that can be sent in the determined period). The WTRU may send the user data to a buffer until the maximum transmission rate will not be exceeded or until expiration of the determined period of time.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
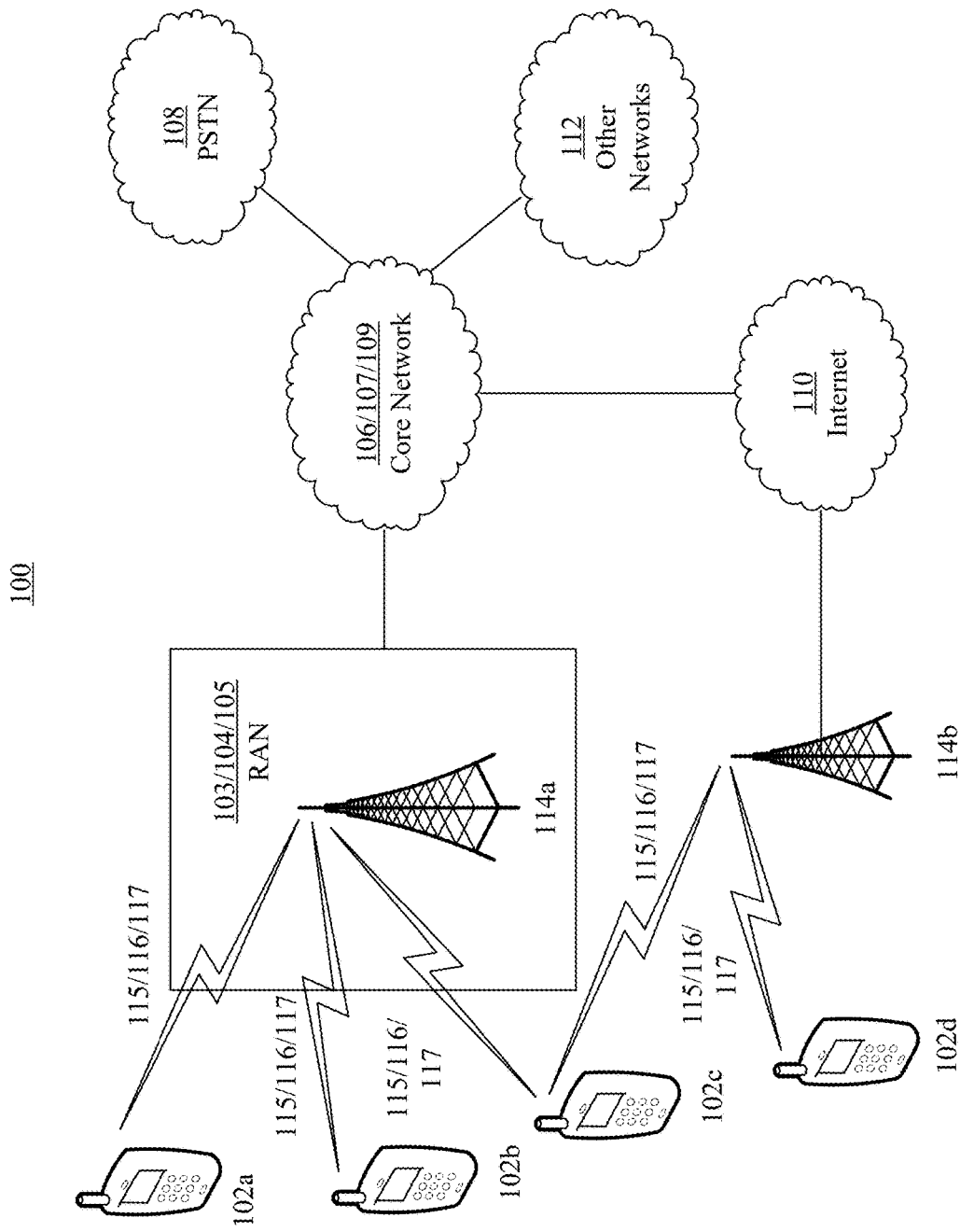
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102*a*, 102*b*, 102*c*, and/or 102*d* (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
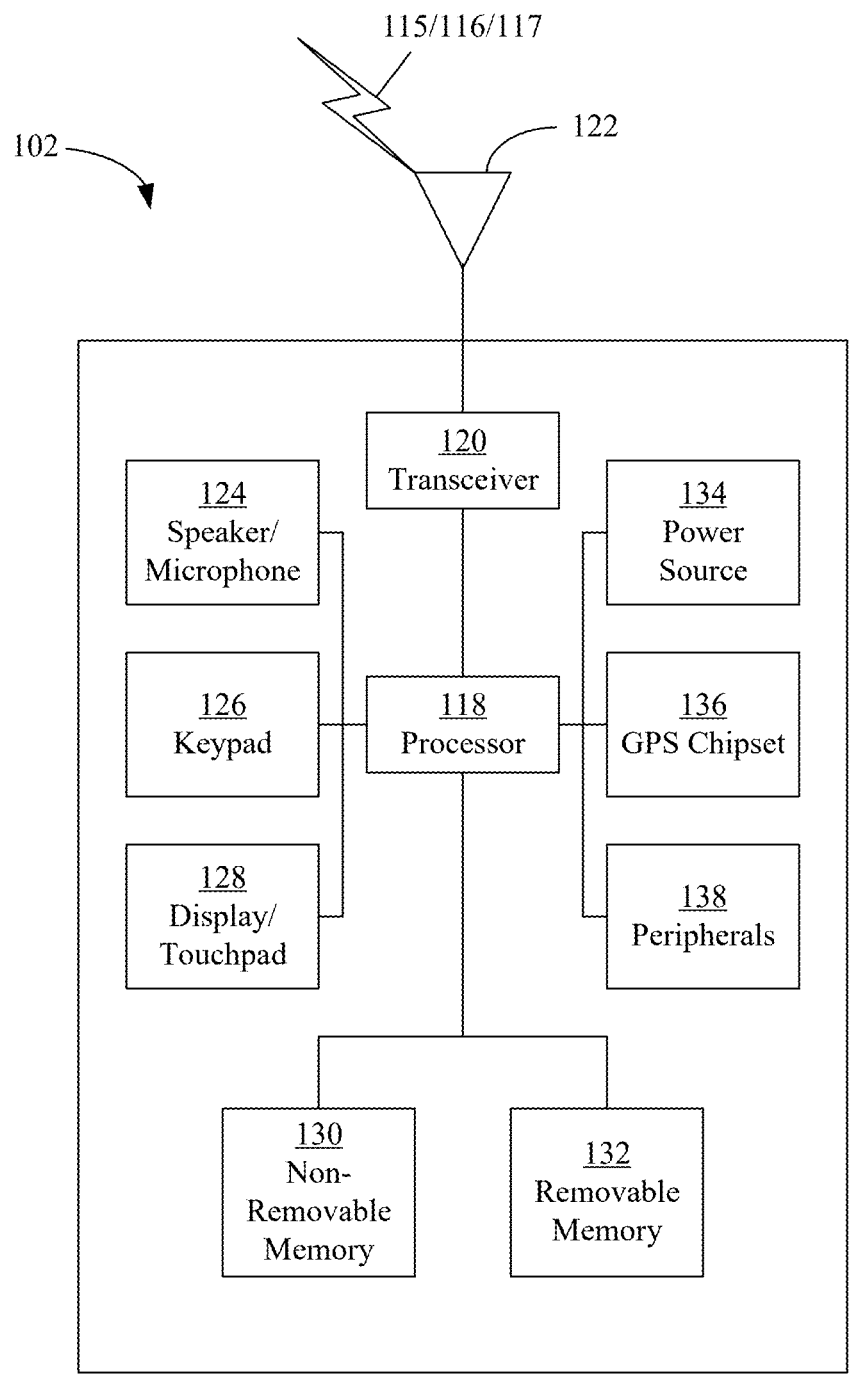
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
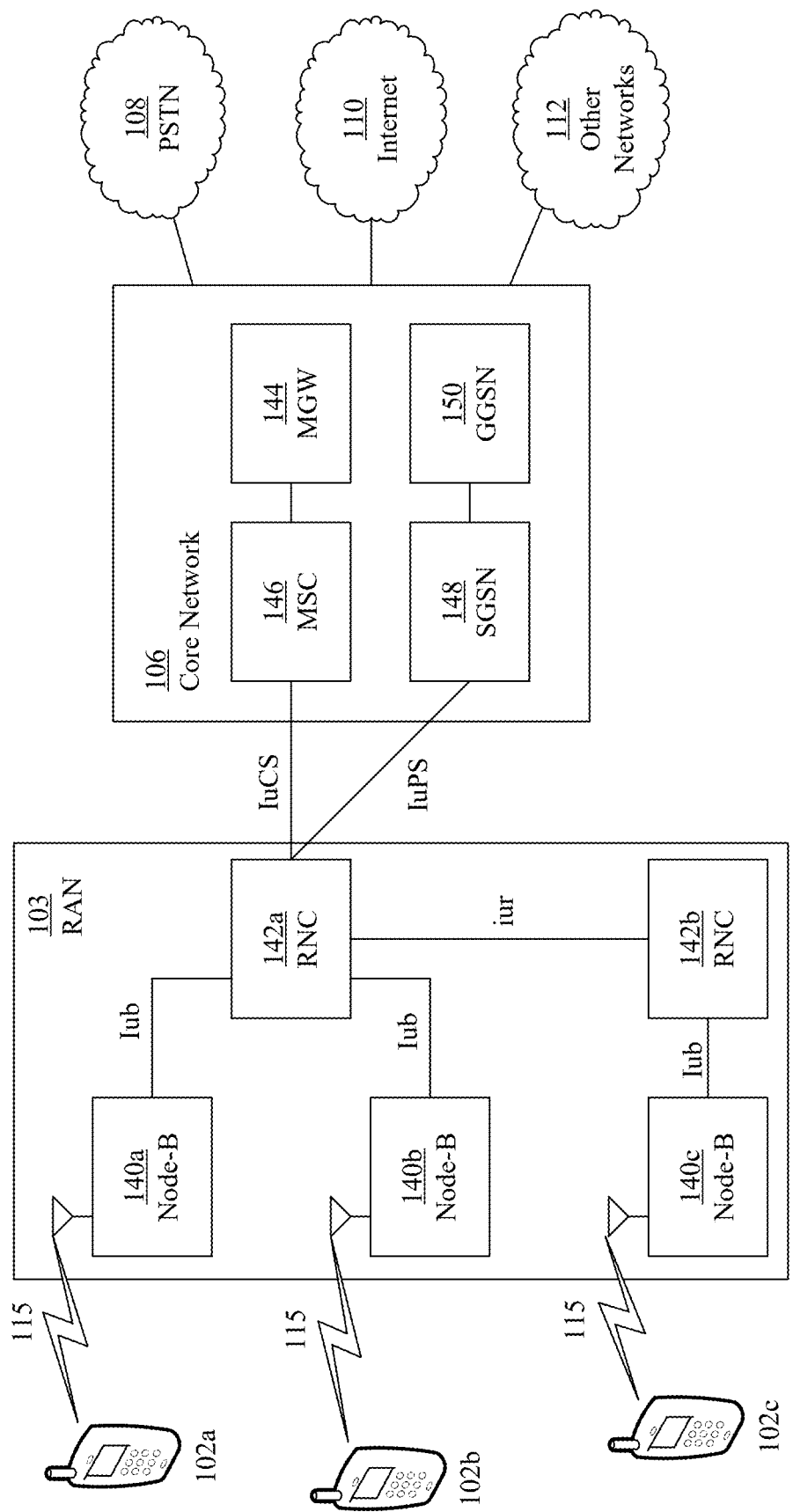
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
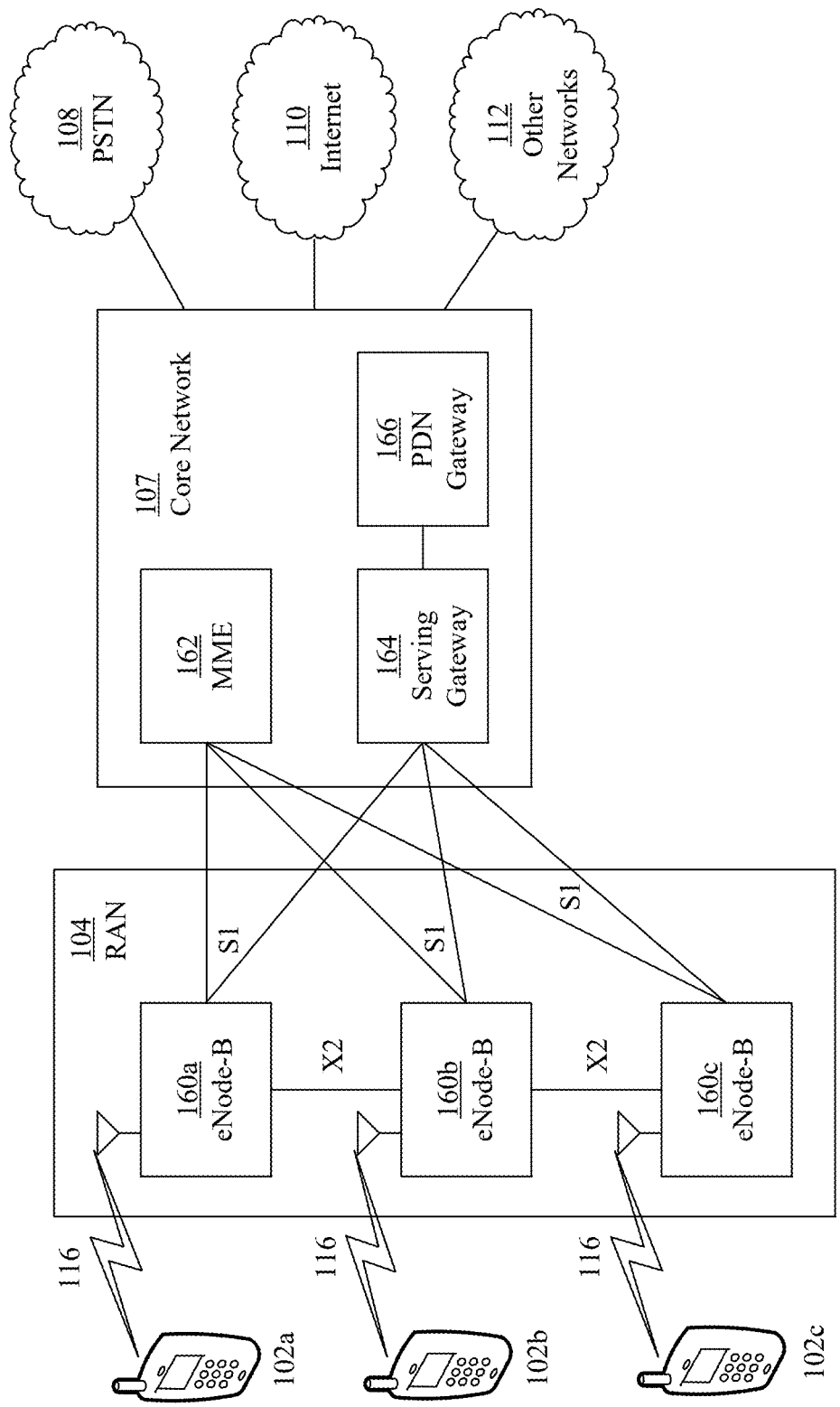
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
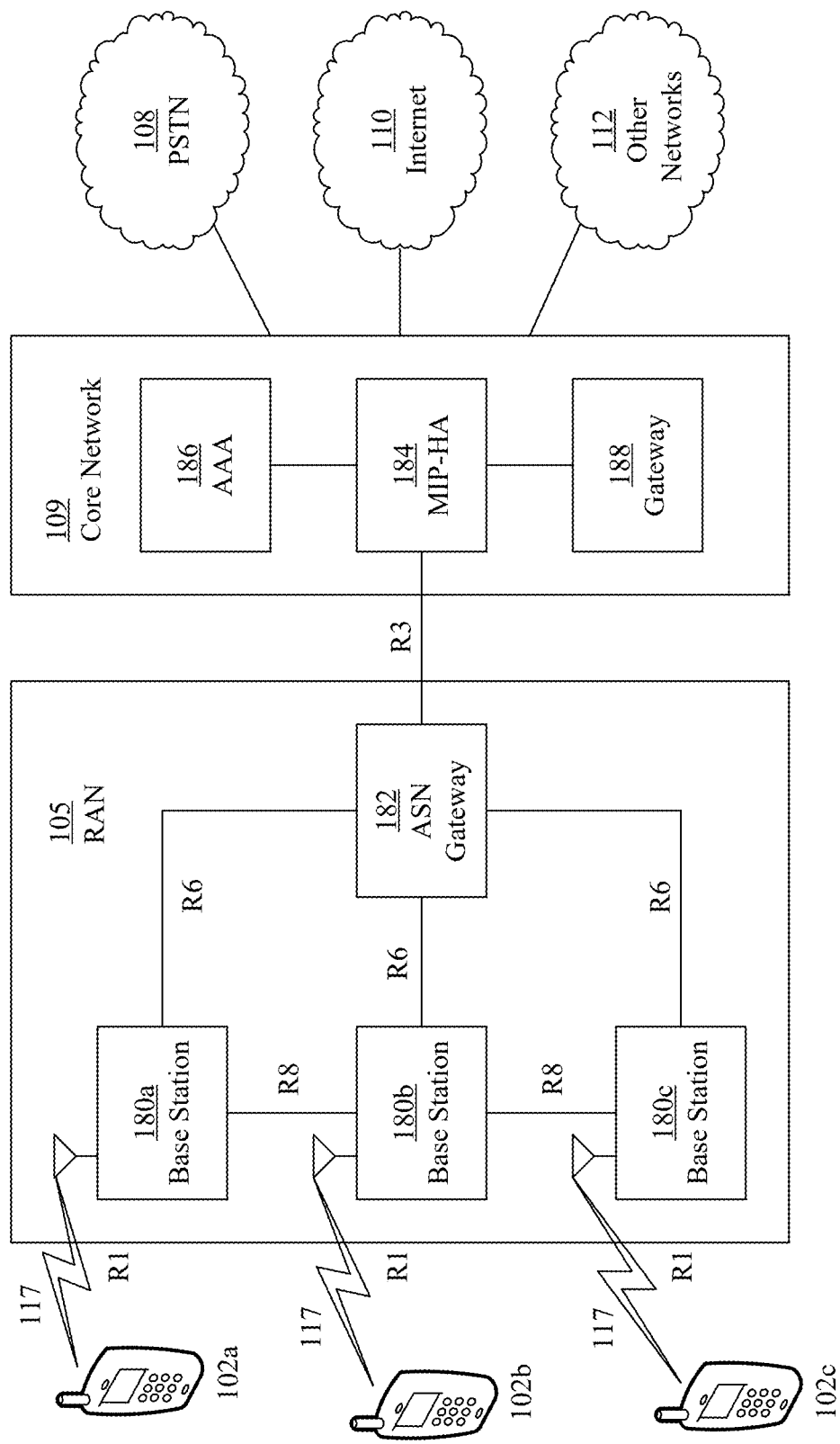
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed for enhancements to non-access stratum (NAS) Protocol to transmit small data over signaling plane. Small data may include user plane data. As an example, a WTRU that corresponds to a machine type communication (MTC) device, such as a sensor, may transmit small amounts of user plane data relatively infrequently. Such a device may utilize the techniques described herein in order to transmit and/or receive user plane data using a control plane protocol such as a NAS protocol/message. For example, a network may send an NAS message (e.g., Service Accept) to complete a service request procedure, e.g., without establishing user plane bearers. The NAS message may be sent to the WTRU. The NAS message may be a Service Accept message. The NAS message may indicate completion and/or success of a Service Request procedure. In an example, a network may send an indication to a Radio Access Network (RAN). The RAN may send a Radio resource control (RRC) message to the WTRU. The RRC message may indicate (e.g., without setting up a user plane bearer) that one or more lower layers of the WTRU report successful completion of the service request procedure to the NAS (e.g., EPS Mobility Management (EMM)) layer. The WTRU may, for example, include an indication (e.g., such as a control plane only indication) in a Service Request message, an extended service request message, and/or another type of service request message.

A network may send a Non-Access Stratum (NAS) message (e.g., Service Accept message) to complete a service request procedure without establishing user plane bearers. An NAS message may be sent to a WTRU (e.g., Service Accept message) to indicate completion and/or success of a service request procedure. In an example, a network may send an indication to a Radio Access Network (RAN). The RAN may send a Radio resource control (RRC) message to the wireless transmit receive unit (WTRU). The RRC may indicate (e.g. without setting up user plane bearers) that one or more lower layers of the WTRU report successful completion of the service request procedure to the NAS (e.g., EPS Mobility Management (EMM)) layer. The WTRU may, for example, include an indication (e.g., such as "control plane only") in a Service Request message, an extended service request message, and/or a special type of service request message.

Signaling and/or user data in a NAS message may be identified and/or distinguished, e.g., to inform the receiver whether the NAS message includes user data. Signaling and/or user data in a NAS message may be distinguished, for example, by implementing one or more of the following: distinguishing sequence numbers, defining a code-point in the Security Header Type, defining a protocol discriminator value, using different scrambling codes, indicating data in lower layers when data is sent, and/or other techniques. Different message handling may be applied to NAS data and messages.

A WTRU may send, to the network, a request to transition from idle mode to connected mode. The request may include mobile origination data in a NAS protocol data unit (PDU). The WTRU may receive an RRC connection release message. The WTRU may determine that the request has been rejected based on the RRC connection release message. The RRC connection release message may include a cause value for rejection. The RRC connection release message may include a back-off timer. The WTRU may indicate to one or more upper layers that the mobile origination data has not been transmitted. The WTRU may determine an amount of time to wait before re-sending the NAS PDU. The amount of time may be indicated by the back-off timer.

For example, a WTRU may send a first NAS message to a network device (e.g., a MME). The first NAS message may be a service request message. The first NAS message may include a request to send user data via a control plane. The network device may receive the first NAS message and may determine whether to allow the WTRU to send user data via the control plane. The network device may establish the control plane for the WTRU. The network device may determine a maximum transmission rate for the WTRU to send user data via the control plane. The network device may send a second NAS message to the WTRU. The second NAS message may be a service accept message. The second NAS message may indicate that the control plane has been established for the WTRU and/or the determined maximum transmission rate.

Signaling and/or user data in an NAS message may be identified and/or distinguished, e.g., to inform a receiver whether the NAS message includes user data. Signaling and/or user data in an NAS message may be distinguished by including one or more distinguishing sequence numbers. Signaling and/or user data in an NAS message may be distinguished by defining a code-point in a Security Header Type. Signaling and/or user data in an NAS message may be distinguished by defining a protocol discriminator value. Signaling and/or user data in an NAS message may be distinguished by using different scrambling codes. Signaling and/or user data in an NAS message may be distinguished by indicating data in lower layers when data is sent. Different message handling may be applied to NAS data and/or messages.

Figure 2:
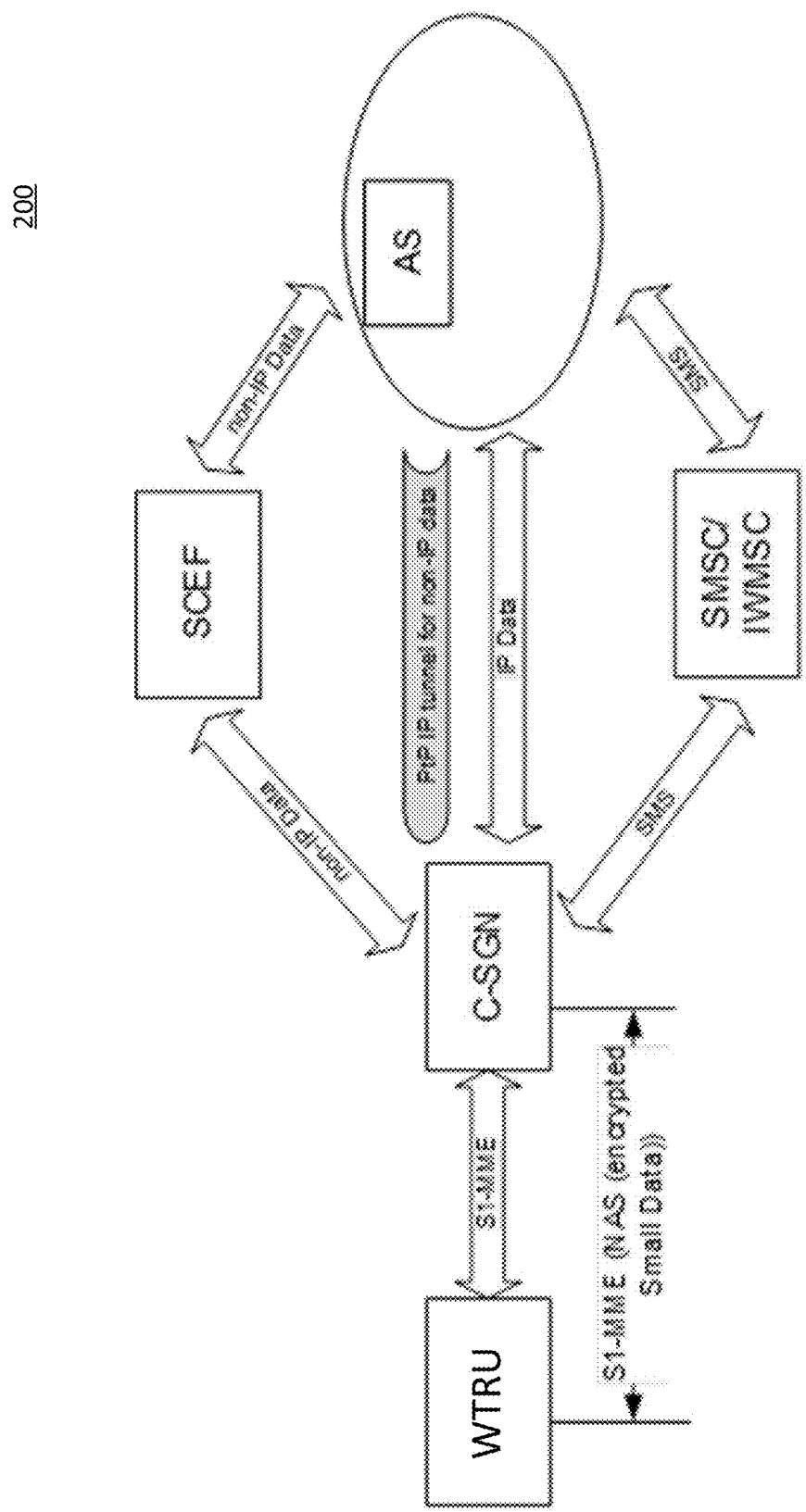
FIG. 2 is an example of an end-to-end small data flow architecture.

FIG. 2 is an example of an end-to-end small data flow architecture 200. Cellular internet of things (CIoT) may be used for small data transmissions. Support may be provided for small data transmissions for CIoT. The small data transmissions may be infrequent. An attach procedure may be provided for CIoT devices. A NAS message may carry one or more user data packets. For example, User Plane information may be sent over the Control Plane. The Control Plane may be referred to as the NAS protocol and/or signaling radio bearer over the radio. The Control Plane may be referred to as the S1 interface towards the core network.

A WTRU in Idle Mode, e.g., in LTE/EPS Idle Mode, may transition to Connected Mode. The WTRU may transition to connected mode to send and/or receive user data and/or signaling, e.g., via a Service Request procedure. The completion of a Service Request procedure may typically be based on the establishment of one or more User Plane Bearers. However, rather than being used to establish user plane bearers, the Service Request procedure may be used to establish a Control Plane (e.g., NAS messages) that may be used to transfer user plane data. In such a scenario, user data may be sent via the control plane (e.g., without the establishment of a user plane bearer).

Data (e.g., user plane data) and signaling (e.g., control plane signaling such as RRC messages, NAS messages, etc.) may be transmitted simultaneously (e.g., in a single message and/or transmission). For example, one or more data packets may be sent via one or more NAS signaling messages. A secure NAS connection may be used between a device (e.g., a WTRU) and the network (e.g., a Mobility Management Entity (MME)). One or more security protected NAS messages may be sent via the secure NAS connection. The exchange of security protected NAS messages may be based on the usage of one or more algorithms for integrity protection and/or ciphering. A security protected NAS message may be sent in a wrapped around NAS message (e.g., whether both integrity and ciphering or only integrity will be used). The wrapped around NAS message may include a header and/or an NAS sequence number. The NAS sequence number may be used, for example, as an input to the one or more algorithms. The NAS sequence number may be used for discarding in case a message is received out of order. A receiver may not know whether a received message of the one or more NAS signaling messages is carrying data. Control signaling information may (e.g., always) have a higher priority than user data in a cellular system. A receiver (e.g., the device) may receive one or more out of sequence messages. In an example where messages 1, 2, 3, 4, and 5 have been sent by a transmitter, message 1 and message 5 may be NAS signaling messages while messages 2, 3, and 4 may be NAS messages carrying user data. The receiver may discard message 5, for example, when message 4 is lost.

Figure 3:
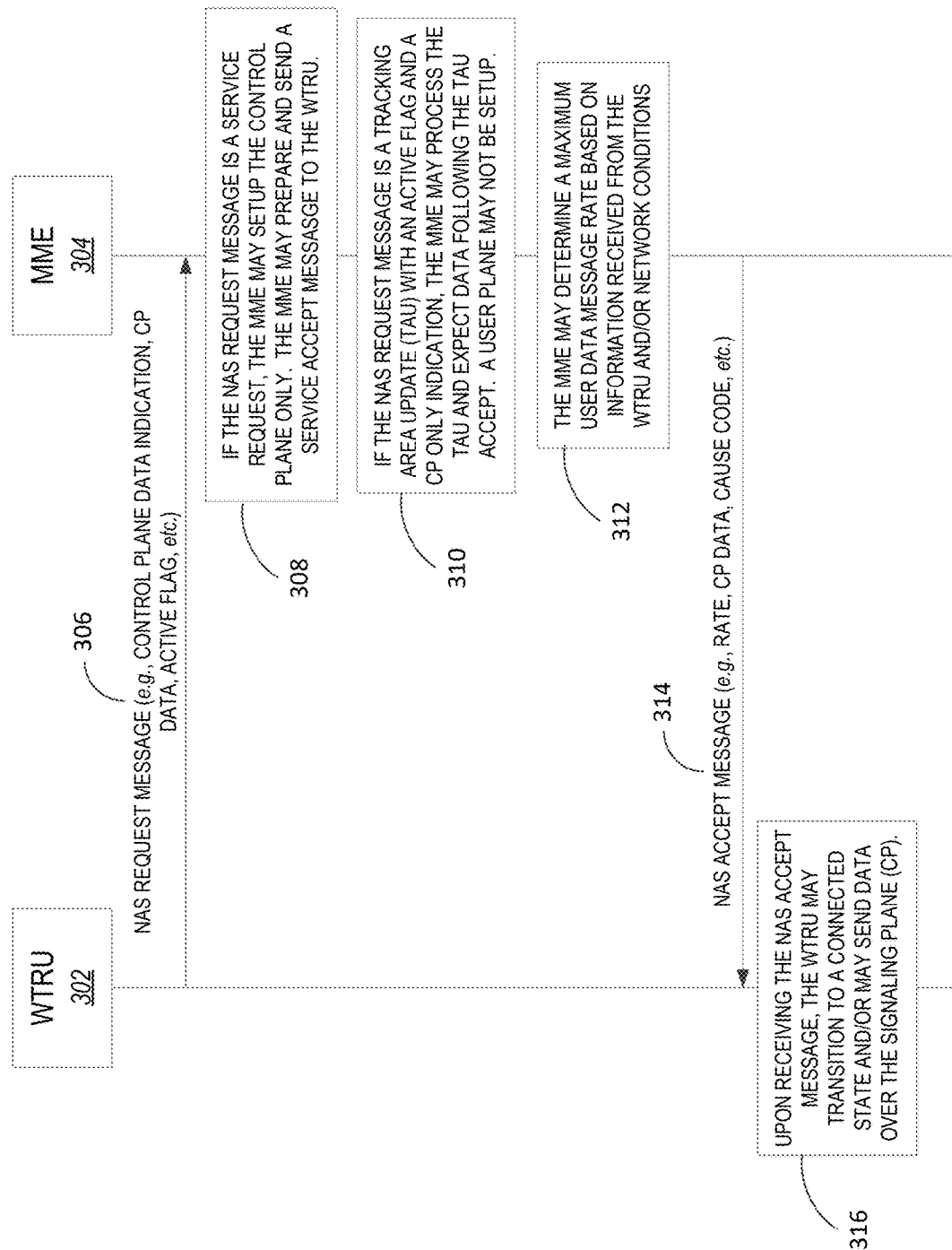
FIG. 3 is an example of using NAS messages to establish a control plane for user data.

FIG. 3 is an example of using NAS messages to establish a control plane for user data. A WTRU 302 may send a NAS request message 306 to a MME 304. The NAS request message 306 may include one or more of a control plane data indication, control plane data, and/or an active flag. At 308, if the NAS message is a service request message, the MME 304 may setup the control plane only and may send a service accept message to the WTRU 302. At 310, if the NAS request message 306 is a tracking area update (TAU) message with an active flag and a CP only indication, the MME 304 may process the TAU and expect to receive data following the TAU accept. The MME 304 may not setup a user plane. At 312, the MME 304 may determine a maximum user data message rate, for example, based on information received from the WTRU 302 and/or one or more network conditions. The MME 304 may send a NAS accept message 314 to the WTRU 302. The NAS accept message 314 may indicate the maximum user data message rate. The NAS accept message 314 may include CP data and/or a cause code. At 316, upon receiving the NAS accept message 314, the WTRU 302 may transition to a connected state and/or may send data over the control plane. For example, the WTRU 302 may send user data over the control plane at a rate which does not exceed the maximum user data message rate determined by the MME 304.

A WTRU may transition from idle mode to connected mode by sending a service request message. For example, a WTRU in idle mode may need to send mobile originated (MO) data (e.g., user data). The WTRU may send a request to the network to transition from idle mode to connected mode. The WTRU may transition from idle mode to connected mode by sending a NAS message PDU (e.g., a NAS PDU) in a RRC Connection Setup Complete message to the network (e.g., the MME). For example, the WTRU may establish an RRC connection. The WTRU may send, via the RRC connection, uplink data. The uplink data may be encrypted and/or integrity protected. The uplink data may be sent in a NAS message PDU. The WTRU may indicate (e.g., in a Release Assistance Information, in the NAS message PDU) whether downlink data transmission (e.g., acknowledgements and/or responses to uplink data) subsequent to the sent uplink data is expected. The WTRU may indicate whether to release the S1 connection when downlink data is received. The WTRU may transition from idle mode to connected mode when the network receives the NAS PDU. The network (e.g., the MME) may not accept (e.g., due to congestion) a request from the WTRU to transition from idle mode to connected mode. When the network rejects the WTRU's request to transition from idle mode to connected mode, the network (e.g., the MME) may send a service reject message to the WTRU. The service reject message may include a cause value that indicates, to the WTRU, the reason for rejecting the WTRU's request to transition from idle mode to connected mode. The WTRU may not send the service request message when requesting transition to connected mode. For example, the WTRU may send a NAS PDU in the RRC message to request transition from idle mode to connected mode.

A service request, e.g., in LTE, may be completed, for example, by having the network send an NAS message (e.g., Service Accept) completing the procedure, e.g., without establishing a user plane bearer to indicate completion of the procedure. In an example, an NAS message may be sent to the WTRU (e.g., a Service Accept message), for example, to indicate the completion and/or success of the Service Request procedure. The WTRU may, for example, include an indication (e.g., such as a control plane only indication) in an NAS message (e.g., a Service Request message, an extended service request message, and/or another type of service request message). The WTRU may include the control plane indication to inform the MME/CSGN or the network that the service request procedure is being executed (e.g., only) to establish a control plane. When the network receives the control plane indication, the network may proceed with the service request without the establishment of a user plane bearer. For example, the network may establish the control plane for the WTRU. The network may send an NAS message (e.g., a service accept message) to the WTRU. The NAS message may indicate that the control plane has been established for the WTRU.

A Service Accept message may include a type of data the WTRU may send over the control plane (e.g., IP packets, non-IP packets, SMS). The service accept message may include header information for the user data packet (e.g., SCEF address, AS address, IP address, etc.). The service accept message may include a size of data that can be sent per NAS SDU and/or a number of NAS SDUs that can be sent. The network (e.g., the MME) may indicate, for example, in an NAS message (e.g., an Attach message or a tracking area update (TAU) Accept message) a transmission rate (e.g., a maximum transmission rate) at which the WTRU can send data over the control plane (e.g., NAS). The transmission rate may be indicated as X messages per connection, X messages per connection, Y connections per time T, and/or the like. X and Y may be integers. T may be a real number indicating a period of time in any combination of seconds, minutes, hours, etc. The network may indicate when the message may be sent. The network may indicate that the massage may be sent at a specific time and/or based on occurrence of an event. For example, the network may indicate that the message may be sent (e.g., only) when the WTRU is due to perform periodic registration. The WTRU may buffer user data to send until the time that the network indicates that the message may be sent (e.g., when a periodic registration is due). A WTRU may send the NAS PDU carrying the user data, e.g., after transitioning to connected mode for a periodic registration.

The service accept message may include a reference to a set of security parameters and/or algorithms that may be used when sending the NAS SDU that carries the user data. The reference may indicate whether the user data should be integrity protected and/or ciphered. A WTRU may have a set of security keys and algorithms that may be used when sending user data over NAS PDU. The WTRU may receive an indication in the NAS message to use a set of security parameters, algorithms, and/or the like. When sending the user data via the NAS PDU, the WTRU may use one or more indicated security parameters, algorithms, and/or the like. The WTRU may apply a message transmission rate. The message transmission rate may be indicated in an NAS message received from the MME. The message transmission rate may be a maximum transmission rate that the WTRU can send user data via NAS messages.

Information that may be included in a Service Accept message may be included in a Service Request message from a WTRU. The WTRU may include information in a service request message. The information may include one or more of a proposed number of NAS PDU to send, a proposed size per NAS PDU, a proposed rate of transmission, and/or the like. The service request message may include a request to send user data via the control plane. The WTRU may send the information, for example, based on one or more configurations in the WTRU, based on a request from the application layer (e.g., the application layer may indicate the size of available data to send), and/or based on a user setting via a user interface.

A network may send an indication to the RAN, for example, to permit the RAN to send an RRC message to the WTRU. The RRC message may not set-up the user plane bearers. The RRC message may indicate to the WTRU that one or more lower layers of the WTRU report successful completion of the service request to the NAS (e.g., EPS Mobility Management (EMM)) layer.

In an example, a WTRU may (e.g., during a Tracking Area Update (TAU)) set up a control plane bearer to send user data. The WTRU may establish one or more user plane bearers. The WTRU may establish the one or more user plane bearers using an active flag (e.g., when the WTRU has pending data to send during the TAU). An information element (IE) (e.g., such as a control plane flag IE) may be included, e.g., in a TAU Request message, when a WTRU sends user data over a control plane during the TAU. In an example, a value of an active flag (e.g., value "2") may indicate to the network that the WTRU has pending data to be sent over the control plane. The network may keep an NAS Signaling connection active, e.g., for user plane traffic to be sent by the WTRU over the NAS signaling connection. The network may keep the NAS signaling connection active when the network receives an IE (e.g., such as a control plane flag IE), a value of active flag, and/or any other indication (e.g., from the WTRU in the TAU request to the network) that the WTRU has pending data. The network (e.g., MME and/or CSGN) may not establish a user plane bearer when an indication is received in the TAU request message. The network may include (e.g., in the TAU response message to the WTRU) an indication in a message to the WTRU that indicates that an NAS Signaling connection is active. The indication that the NAS signaling connection is active may indicate that the WTRU may use the control plane resources to transmit the pending user data.

A network may not accept a Service Request and/or a TAU Request message from the WTRU. In an example, the network may not accept a Service Request and/or a TAU Request message when the WTRU sends a request to transmit user data over a control plane while the WTRU is roaming. The network may reject the service request and/or TAU request, for example, by sending a Service Reject and/or a TAU Reject message. In a roaming example, user data may be sent through the PGW. One or more user plane bearers may be established to send the user data via the PGW. A rejection message may include a cause value. The cause value may indicate one or more reasons for rejection.

The one or more reasons for rejection may include that sending user data via the Control plane is not allowed when the WTRU is roaming.

Figure 4:
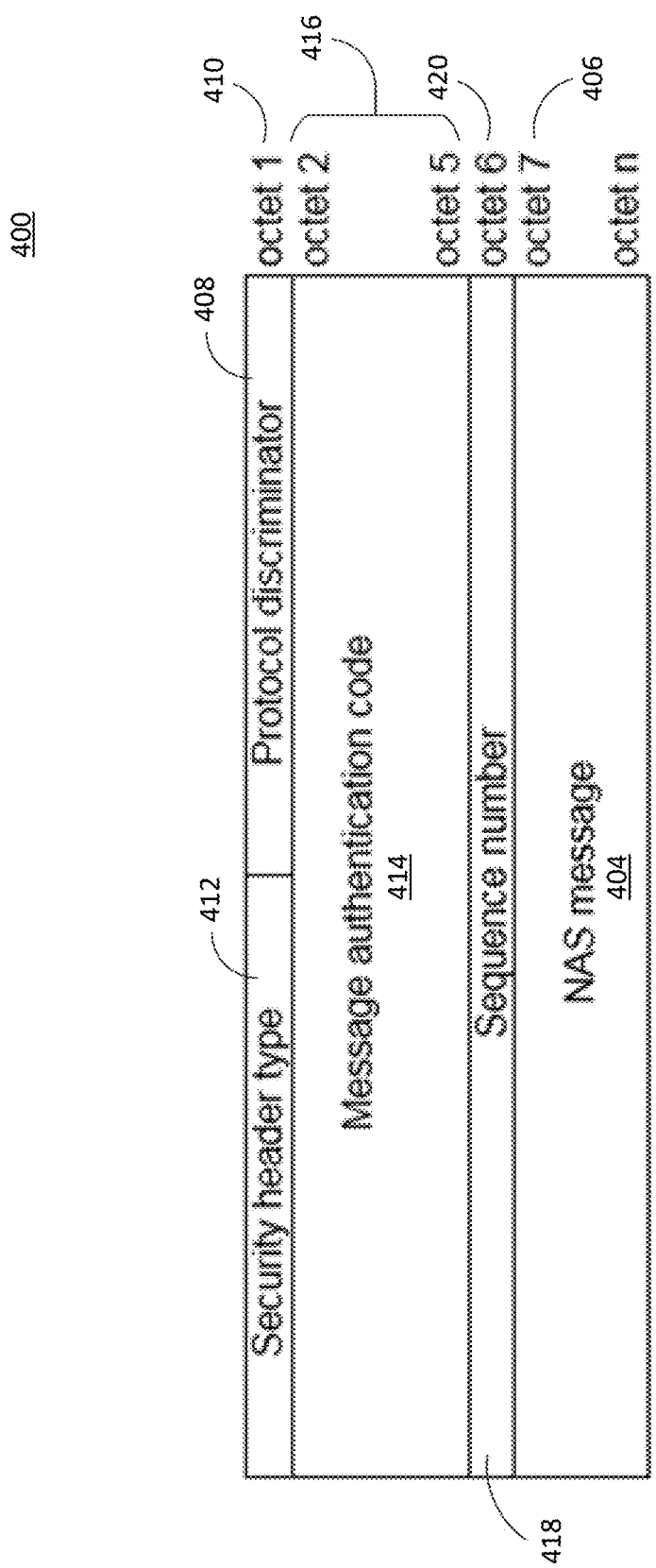
FIG. 4 is an example of general message organization for a security protected NAS message.

FIG. 4 is an example of general message organization for a security protected NAS message 400. Signaling and user data may be distinguished. One or more (e.g., the first 6) octets of the security protected NAS message 400 may be used for security protection. The NAS message 404 may start in Octet 7 406. The security protected NAS message 400 may include a protocol discriminator 408. The protocol discriminator 408 may be included in Octet 1 410. The protocol discriminator 408 may (e.g., always) indicate "EMM." The security protected NAS message 400 may include a security header type field 412 that indicates a level of security protection (e.g., an indication of "Integrity Protected" or "Integrity Protected and Ciphered"). A receiver may determine how to respond to the security protected NAS message 400. The security protected NAS message 400 may include a Message Authentication Code 414 (e.g., in octets 2-5 416). The message authentication code 414 may be used for integrity checking. The security protected NAS message 400 may include a Sequence Number 418, for example, in octet 6 420. The sequence number 418 may have multiple (e.g., two) functions. The sequence number 418 may be an input to an Integrity and Ciphering algorithm. The sequence number 418 may indicate whether a message is out of sequence. The receiver may discard an out of sequence message.

As indicated herein, an NAS message may carry user data. A receiver of the NAS message may view the NAS message as a regular data PDU. The receiver may be a network device, for example, such as a MME. Applications at a WTRU and/or at a network device may deal with lost and/or out of sequence data (e.g., user data). One or more signaling messages may be exchanged between the device and the network.

A receiving entity (e.g., a network device) may receive a message (e.g., a NAS message) with a sequence number. The receiving entity may determine that the message has been received out of sequence. The receiving entity may strip an NAS message from a (e.g., any) message that has been determined to have been received out of sequence. The message that has been determined to have been received out of sequence may be an out of sequence message. The receiving entity may discard one or more out of sequence messages that include user data. The receiving entity may continue decoding and/or processing the NAS message. The receiving entity may mark a received sequence number as a data sequence number, e.g., so that the marked sequence number is not expected to appear in forthcoming NAS signaling messages.

A WTRU may have a list per NAS message content. In an example, a first list may include one or more sequence numbers used for and/or received. The one or more sequence numbers in the first list may be carrying an NAS signaling message. A second list may include one or more sequence numbers that have been used to carry user data. The WTRU may update the first list and/or the second list. For example, the first list and/or the second list may be updated to permit detection of a sequence number X that is used for carrying user data is no longer expected in another NAS message that carries signaling, such that absence of the sequence number X is not considered as an out of order sequence number.

A code-point, e.g., in the Security Header Type, may be defined. The code-point may inform and/or signal a receiver whether an NAS message includes user data. The receiver (e.g., for a given message) may verify a code-point. For example, the receiver may verify the code-point to determine whether an NAS message is carrying NAS signaling and/or user data. The receiver may continue processing a message indicated (e.g., by a code point) to be user data, e.g., even when the sequence number of the message is determined to be out of order. The receiver may discard an out of order message indicated to be an NAS message.

A value for protocol discriminator may be defined, for example, to inform a receiver whether an NAS message includes user data. The receiver may verify (e.g., for a given message) a value for the protocol discriminator to determine whether the NAS message is carrying NAS signaling and/or user data. The receiver may continue processing a message indicated (e.g., by a Protocol Discriminator value) to be user data, e.g., even when the sequence number of the message is determined to be out of order. The receiver may discard an out of order message indicated to be an NAS message.

A sequence number field may be left empty, for example, when a protocol discriminator value is used. A WTRU and/or a MME may keep the sequence number field empty, for example, when the WTRU and/or the MME sends an NAS message with user data. The NAS message may include a Protocol Discriminator field value that indicates an NAS message with user data.

A sequence number field may be used, for example, when a protocol discriminator value is used. The sequence number field used with a protocol discriminator value may be independent of one or more sequence numbers used for a NAS signaling message. A WTRU and/or the network (e.g., a MME) may consider a set of parameters that may include {Protocol Discriminator, Sequence Number} (e.g., rather than the sequence number alone). A first set of sequence numbers may be used for one or more NAS messages carrying signaling. A second set of sequence numbers may be sued for one or more NAS messages carrying user data. The first set of sequence numbers may be independent of the second set of sequence numbers. The WTRU and/or the network may be able to differentiate NAS signaling from user data. The WTRU and/or the network may respond to the NAS PDU, for example, by discarding an NAS message with sequence numbers that are out of order.

An acknowledgement (ACK) message may be sent by a receiver. The ACK message may acknowledge the receipt of an NAS message of sequence number X, where X may be an integer. The ACK message may be sent regardless of the technique(s) used. An ACK NAS message may have an empty content while a header may reflect the protocol number and/or sequence number received and/or used by a transmitting node (e.g., a transmitting entity). The transmitting node may start a timer. The timer may guard a window during which an ACK message may arrive. A transmitting entity may re-transmit a message and re-start the timer, for example, when the timer expires without reception of an ACK message.

A transmitting NAS entity may stop the timer, for example, when an ACK message is received. An acknowledging entity may include one or more (e.g., a set of) sequence numbers in a NAS message, e.g., to acknowledge one or more (e.g., a set of) NAS messages that were used to carry data. A receiving entity (e.g., the entity that receives the ACK message) may stop one or more timers corresponding to one or more sequence numbers of the messages previously sent, for example, when an ACK message is received with one or more (e.g., a set of) sequence numbers.

In an example, a lack of NAS message for an ACK message (e.g., the lack of octet 7 to n shown in FIG. 2) may indicate (e.g., implicitly) that the message is an ACK message. In an example, a protocol discriminator field value may be defined. The protocol discriminator field may indicate that an NAS message is an acknowledgement for previously transmitted data over one or more NAS messages. In an example, a WTRU may send an ACK NAS message to the MME and/or vice versa for a received DL NAS message that carries data.

In an example, an implicit ACK may be implemented, for example, by using a lower layer ACK. For example, a WTRU may send an NAS message to an MME. One or more lower layers in the WTRU (e.g., RRC, RLC, PDCP, MAC layer(s)) may receive an ACK indicating that the data has been received at the eNB. The one or more lower layers may indicate receipt of the ACK to the NAS message. The receipt may act as an implicit ACK for the WTRU. The implicit ACK may be enabled, for example, by an NAS entity in a WTRU informing the one or more lower layers when an ACK is needed for an NAS message. The one or more lower layers may send the ACK indication to the NAS entity, for example, when requested to do so by the NAS entity.

An implicit ACK may be applied at the network side, for example, between an eNB and an MME. For example, the MME may request that the eNB forward an NAS message to the WTRU, e.g., by using the DL NAS Transport message over the S1AP interface and/or protocol. The MME may include an indication that requests an ACK to indicate when the WTRU received the message. The WTRU's lower layer operation may indicate an ACK to the eNB, for example, when a WTRU receives the NAS message that carries user data. The eNB may (e.g., when requested by the MME) send an S1AP message to indicate an implicit ACK by the WTRU.

A network and a WTRU may negotiate the usage of certain Scrambling Codes during the registration phase. A sender (e.g., the network or the WTRU) may apply a first scrambling code, for example, on a first six octets, when the message includes user data. The sender may apply a second scrambling code when the message does not include user data. A scrambling code may be rendered more powerful, for example, by using an identity of the WTRU (e.g., S-TMSI) as an input to the encoding and/or decoding algorithms. A receiver (e.g., the network or the WTRU) may apply the first and second scrambling codes. The receiver may decode the first 6 octets using the first and second scrambling codes. The first 6 octets may indicate the content (e.g., user data vs. NAS message) of the message to the receiver. The use of scrambling codes may be implemented without changing the header (e.g., the first 6 octets) of the message. The use of scrambling codes may be backward compatible.

In an example, one or more indications in lower layer messages that carry the NAS PDU, which in turn may be carrying user data, may be used. The term NAS data may refer to one or more NAS messages that carry user data.

A WTRU and/or an NAS entity in the WTRU may indicate to one or more lower layers (e.g., when the WTRU sends NAS data) that the message being sent is NAS data. The one or more lower layers (e.g., RRC) may include an indication in a corresponding lower layer PDU (e.g., in the RRC message, RLC message, etc.), e.g., to inform the eNB, that the NAS PDU is carrying NAS data. An indication may be included in the RRC message, RLC, PDCP, and/or MAC, e.g., in the header.

The eNB (e.g., upon receiving a message) may verify one or more entities, one or more layers (e.g., the RRC, RLC, MAC, PDCP, etc.), and/or the received message, for example, to check for an indication that the NAS message is actually NAS data. An eNB may include an indication that the NAS message is NAS data (e.g., a NAS data indication), for example, when forwarding the NAS message to the MME. The indication may be used by the MME, for example, to determine whether the NAS message is carrying NAS data and/or NAS signaling. The MME may handle the message with a sequence number, for example, in accordance with an example message handling. In an example, the MME may process an NAS message regardless of the sequence number and/or regardless of whether the sequence number is out of order, for example, when the indication received (e.g., by the MME) from the eNB indicates the content of the message is NAS data. The MME may determine that the NAS message is carrying NAS signaling. The MME may apply appropriate treatment (e.g., discard the NAS message when the sequence number is not ordered), for example, when the indication is that the NAS message is signaling and/or there is a lack of a NAS data indication in the S1AP message received from the eNB.

Behaviors may be applicable when the WTRU sends NAS signaling. In an example, a WTRU may indicate to one or more lower layers that the message being sent is NAS signaling, for example, when the WTRU sends an NAS signaling message. The behavior in the eNB may be similar (e.g., the same) to the WTRU. The eNB may forward a NAS signaling indication to the MME.

Behaviors may be applicable in the downlink (DL) from the MME/SGSN perspective. For example, an MME may indicate whether an NAS message is a NAS signaling message and/or a NAS data message, for example, when the MME sends an NAS message. An indication may be included in an S1AP message sent to an eNB (e.g., in the DL NAS Transport). The eNB may include an indication in the RRC message (e.g., the RRC message header) and/or as part of the header of the RLC, PDCP, and/or MAC entity sent to the WTRU. One or more lower layers in the WTRU may forward the indication with an NAS message to the NAS entity. The NAS entity may determine, e.g., based on this indication, whether the NAS message is carrying NAS signaling and/or NAS data. The NAS entity may process the message accordingly, e.g., the NAS entity may discard the message (e.g., when the sequence number is not ordered) and/or the NAS entity may process the data, for example, when the sequence number is not ordered and the NAS entity has received (e.g., from the lower layers) a NAS data indication with the message.

Example implementations and/or other implementations applicable to the MME and eNB may apply, e.g., respectively, to the SGSN and/or RNC. Example implementations and/or other implementations may be applied to NAS entities in the WTRU and/or the network (e.g., in the MME or SGSN). One or more lower layers (e.g., from a WTRU perspective) may mean any layer below the NAS (e.g., RRC) or a combination of layers below the NAS. One or more lower layers (e.g., from a network perspective) may mean the eNB or the RNC (e.g., depending on the system).

A WTRU may send a request to transition from idle mode to connected mode (e.g., without sending a service request message). The request may be sent via a MO data (e.g., user data) in a NAS PDU. The network may reject the WTRU request to transition from idle mode to connected mode (e.g., without the WTRU sending a service request message). The network may reject the WTRU request to transition from idle mode to connected mode when the WTRU sends MO data in a NAS PDU as part of the RRC message. The network may reject a WTRU request to transition from idle mode to connected mode when the WTRU sends a service request message before sending the MO data.

The network may perform a S1 release if the network cannot accept the request from the WTRU to transition to connected mode and/or if the network determines (e.g., prefers) to keep the WTRU in idle mode. The network may trigger the S1 release when it receives MO data in the NAS PDU from the WTRU. The S1 release may include the network sending a S1-AP WTRU context release message to an eNB. The eNB may receive the S1-AP WTRU context release message. The eNB may send an RRC connection release message to the WTRU. The eNB may send the RRC connection release message based on receipt of the S1-AP WTRU context release message. The WTRU may receive the RRC connection release message. When the WTRU receives the RRC connection release message, the WTRU may determine (e.g., implicitly) that the WTRU request to transition from idle mode to connected mode has been rejected and/or that the data has not been transmitted (e.g., forwarded) to the intended destination. The WTRU may indicate to one or more upper layers (e.g., such as the application layer) that the data has not been transmitted. The WTRU may re-send the data in a RRC connection request message. The WTRU may determine an amount of time to wait before re-establishing the RRC connection to send the NAS PDU. The network may determine a back-off timer. The back-off timer may indicate an amount of time to wait before re-sending data to the network. The network may dynamically determine the back-off timer (e.g., to manage network congestion). The network may send an indication, cause value, and/or a back-off timer in the S1-AP WTRU context release message to the eNB. The eNB may include the back-off timer and/or the cause value in the RRC connection release message, and may send the connection release message to the WTRU. The back-off timer may be a previously determined extended wait time. The RRC layer at the WTRU may receive the back-off timer and/or the cause value for rejection. The RRC layer may send the back-off timer and/or the cause value for rejection to the NAS layer at the WTRU. The NAS layer at the WTRU may determine to not send another request and/or an NAS data PDU for the value of the back-off timer (e.g., if the back-off timer is provided). The NAS layer at the WTRU may determine an amount of time to wait to send another request and/or the NAS data PDU if a cause value is provided to the NAS layer by the RRC layer.

The network may send an acknowledgment (ACK) NAS PDU if the network cannot accept a request from a WTRU to transition to connected mode and/or if the network determines (e.g., prefers) to keep the WTRU in idle mode. The WTRU may send a data NAS PDU that indicates whether the WTRU requires an ACK NAS back (e.g., to confirm that the data has been successfully sent). When the network determines not to accept the incoming data NAS PDU from the WTRU, the network may send a negative ACK (NACK) NAS. The NACK may serve as a rejection of the WTRU request to transition to connected mode. The network may determine whether to send the NACK NAS whether the WTRU requested ACK or not. The network may send an ACK PDU that includes a NACK message (e.g., instead of an ACK). The ACK PDU may indicate a reason for rejection and/or a back-timer. For example, the ACK PDU may include one or more IEs that indicate to the WTRU the reason for rejection (e.g., congestion) and/or a back-off timer. The network may include the back-off timer when the network does not want the WTRU (e.g., the NAS layer at the WTRU) to try sending the data NAS PDU for a specific amount of time. The WTRU may expect an ACK or NACK message back from the network (e.g., whether or not the WTRU indicated the ACK request in the data NAS PDU). When the WTRU did not request an ACK PDU and the WTRU does not receive an ACK or NACK from the network for a predetermined amount of time, the WTRU may determine that the request has been accepted by the network (e.g., that the data packet has been successfully transmitted).

The network may send a reject message (e.g., a service reject message) if the network cannot accept the request from the WTRU to transition to connected mode and/or if the network determines (e.g., prefers) to keep the WTRU in idle mode. A service reject message may be sent in response to a service request message received from the WTRU. The service reject message may be used when the network cannot accept an incoming NAS PDU from an idle mode WTRU. A reject message (e.g., a generic "NAS Reject" message) may be introduced and/or used by the network to indicate that the network cannot accept the incoming data packet from the WTRU. The reject message may indicate that the network wants the WTRU to stay in idle mode. The network may include a cause value for rejection in the reject message. The network may include a back-off timer in the reject message. The back-off timer may prevent the WTRU from re-sending the request for a predetermined amount of time.

Systems, methods, and instrumentalities have been disclosed for enhancements to NAS Protocol to transmit data (e.g., small data, user data, etc.) over a signaling plane. A network may send an NAS message (e.g., Service Accept) to complete a service request procedure, e.g., without establishing user plane bearers. The NAS message may be sent to the WTRU (e.g., Service Accept message) to indicate completion and/or success of a service request. In an example, a network may send an indication to a Radio Access Network (RAN), which may send a Radio resource control (RRC) message to the wireless transmit receive unit (WTRU) providing an indication (e.g., without setting up user plane bearers) that lower layers of the WTRU report successful completion of the service request procedure to the NAS (e.g., EPS Mobility Management (EMM)) layer. The WTRU may, for example, include an indication, such as a control plane only indication, in a service request message, an extended service request message, and/or a special type of service request message.

Signaling and user data in NAS messages may be identified or distinguished, e.g., to inform the receiver whether an NAS message includes user data. Signaling and user data in NAS messages may be distinguished, for example, by implementing one or more of the following: distinguishing sequence numbers, defining a code-point in the Security Header Type, defining a protocol discriminator value, using different scrambling codes, indicating data in lower layers when data is sent, and/or other techniques. Different message handling procedures may be applied to NAS data and/or messages.

When data is transmitted over the control plane (CP), congestion may result, for example, from a high number of CP messages carrying the data. Using the NAS to perform mobility management as well as data transmission by a large number of WTRUs may increase the load in the system. Conventional methods of performing congestion control may use a backoff (BO) mechanism, which may be applied at two levels.

A first level BO may be mobility management (MM) BO. A WTRU may be provided with a BO timer, for example, in a NAS message that may be related to MM. When the WTRU receives a BO timer, the WTRU may be prohibited from sending any MM messages, even periodic registration, to the core network (CN) for the duration of the BO timer. If the network wants to contact the WTRU, the network may need to page the WTRUs that are under BO.

If a WTRU receives a BO timer when it sends a Tracking Area Update (TAU) request, the WTRU may not be considered registered. As such, the CN may not know the actual location of the WTRU (e.g., the Tracking Area Identity (TAI) in which the WTRU is in). The CN may initiate a wide-area paging or may send a page with an International Mobile Subscriber Identity (IMSI) that may force an area attach. A wide-area paging and paging with an IMSI to force an area attach may be inefficient in terms of resource usage and/or signaling.

A second level BO may be a session management (SM) BO. A WTRU may be provided with a BO timer per APN and may not be allowed to perform any SM requests related to that APN. The WTRU may be allowed to simply use the existing PDN connection and/or bearers that are associated to that APN.

Using a MM BO mechanism, the WTRU may be prohibited from sending any message to the network (e.g., except for emergency cases) until the network pages the WTRU. However, if the load in the network is due to the data, a finer congestion control mechanism may be used to prohibit data transmission while allowing periodic registration and/or tracking of a device.

It should be noted that although embodiments described herein may use the CP primarily, the methods may apply to transmissions on the user plane (UP) since data sent over the UP will still traverse the same CN node (e.g., the C1oT serving gateway node (C-SGN) or MME). The term BO may refer to a complete BO or a complete halt in data transmission. The term BO may refer to a signaled rate of data transmission (e.g., such as 2 messages per hour).

A Service Capability Exposure Function (SCEF) and/or a PDN Gateway (PGW) may indicate congestion to the MME and/or C-SGN. It should be noted that the term "MME" may be used interchangeably with the C-SGN or CN of a C1oT architecture.

As indicated, the SCEF and/or PGW may send a congestion notification indication to the MME. The congestion notification indication may be a generic message. The congestion notification indication may be used to indicate, for example, a start of congestion, a stop of congestion, a start of high load, and/or an end of high load. When indicating a high load or a start of congestion, the SCEF and/or PGW may indicate the type of data for which this is sent (e.g., IP data, non-IP data, or both). The SCEF and/or PGW may indicate a time during which no data should be sent from the MME. The SCEF and/or PGW may indicate a preferred rate at which messages can be sent to the SCEF and/or PGW by the MME.

The MME may use this information to start or stop allowing the identified data to be sent by the WTRUs. The congestion notification indication may include or be sent with a list of WTRU identities. The congestion notification indication may apply (e.g., only) to the identified WTRUs in the list. The MME may start a timer (e.g., in order to start congestion control as indicated by the SCEF and/or PGW) during which no data, or a different data rate as indicated by the SCEF and/or PGW, may be allowed or forwarded by the MME. The MME may start a timer for each of the WTRUs in the list or one timer for the list of identified WTRUs.

The MME may perform congestion control for data transmission. The MME may experience high load conditions, e.g., due to data being sent by all WTRUs or a set of WTRUs. The MME may determine that a high load condition is experienced and/or when congestion control should start (e.g., when to reduce data from the WTRUs, optionally on the CP) as per local policy, or after receiving an explicit congestion control request as described herein. The MME may start a timer to guard the period of the congestion control.

If a reduced data rate is desired, the MME may determine, using local policies or an indication from the SCEF and/or PGW, the rate at which all WTRUs or a subset of WTRUs can send data. The rate may indicate no data should be transmitted at all.

The MME may take one or more of the following actions to start congestion control.

The MME may send a congestion control start indication to a RAN node (e.g., an eNB) and may request that the eNB rejects any connection for data over the CP. The MME may include the data type for which the congestion control should be performed (e.g., IP, non-IP, or both).

As such, the eNB may use indications in the RRC message (e.g., establishment cause) to reject the connection and may provide a BO timer to the WTRU. A rejection cause set by the eNB may indicate that no data over the CP is allowed, or that the BO is due to congestion on the CP for data transmission. The RAN and/or eNB may also indicate the data type for which this rejection is sent (e.g., IP, non-IP, or both).

The RAN node and/or eNB may broadcast an indication in a system information block (SIB) about the data type (e.g., IP, non-IP, or both) that is not allowed to be sent over the CP, UP, or both. When the congestion is reduced or mitigated, the MME may notify the RAN node and/or eNB of the reduced or mitigated congestion. The RAN node and/or eNB may start allowing connections for data over the CP in response to receiving a notification of reduced or mitigated congestion from the MME. As such, the RAN node may modify the SIBs to reflect that a data type which was previously blocked is now allowed to be sent by the WTRUs.

The MME may reject a WTRU's NAS message and may indicate in a NAS response message one or more of the following. The MME may indicate the reason for rejection being congestion for sending data over the CP. The MME may indicate a cause code and other information that clearly describes the type of data for which this BO is intended (e.g., IP data, non-IP data, or both) and whether or not it is for data sent over the CP or UP.

The MME may indicate a BO timer for each connection and/or data type that is not allowed. The MME may indicate a rate at which data can be sent (e.g., such as 2 messages per hour).

A WTRU may perform one or more actions when it receives a BO indication. A WTRU may receive a BO indication for a particular data type (e.g., IP, non-IP, or both) that is sent on the CP or UP. The BO indication may include a BO timer, during which a particular action may not be allowed (e.g., no IP data is allowed over CP, no IP data is allowed over UP, or both, etc.).

A WTRU may receive the BO indication in one or more of the following ways.

The WTRU may receive the BO indication from the SIBs by reading the SIBs containing the BO indication and description for which the BO is meant (e.g., nonIP data over CP, IP data over CP, etc.).

The WTRU may receive the BO indication via dedicated RRC signaling (e.g., RRC Connection Reject or RRC Connection Release). The WTRU may receive a description of the reason why the connection was rejected or released, and/or the type of data for which the BO applies (e.g., non-IP data over CP). The WTRU may receive a timer that guards the duration of the BO. The WTRU may send the description, the type of data for which the BO applies, and/or the timer to the NAS layer.

The WTRU may receive a NAS message (e.g., a NAS reject message) with a BO indication describing the data type for which the BO is sent (e.g., non-IP over CP, etc.) and/or a time during which no data transmission is allowed.

When the WTRU receives a BO indication, the WTRU may start a timer and/or stop the transmission of the indicated data type. The WTRU may send other types of data for which a description or BO indication has not been received. The WTRU may send a NAS message for any other purpose that is not related to the received BO indication. For example, if the WTRU receives a BO indication for non-IP data over the CP, the WTRU may be allowed to send a TAU message for periodic registration and/or to change any of its power saving parameters related to DRX or PSM.

If the WTRU receives a particular rate at which messages may be sent, the WTRU may send data according to the particular rate (e.g., 2 messages per hour) as signaled by the network. The WTRU may buffer any packets that are not transmitted until the next transmission time is allowed.

The WTRU may send data (e.g., IP or non-IP) when performing the next TAU even if the BO timer is running. For example, the WTRU may send the data when performing the next TAU if the MME has indicated such in the BO indication and/or NAS reject message. A reduced rate of message transmission may be achieved that takes advantage of a periodic TAU registration to send data.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method performed by a wireless transmit/receive unit (WTRU) for sending data, the method comprising:
    receiving a first message from a network node, wherein the first message indicates a transmission rate, and wherein the transmission rate indicates a maximum number of control plane messages that the WTRU can use to send user data during a first duration of time;
    sending a request message to the network node, wherein the request message comprises user data and indicates that user data is to be sent via a control plane;
    receiving a second message from the network node, wherein the second message comprises a back-off timer value indicating a second duration of time for the WTRU to wait before sending additional user data to the network node, and wherein the second message indicates that a service request procedure has been completed; and
    on condition that the second duration of time has elapsed, sending the additional user data to the network node within the first duration of time using a number of control plane messages that is less than or equal to the maximum number of control plane messages.

2. The method of claim 1, wherein the method comprises sending a third message to the network node, wherein the third message further indicates that the WTRU has requested to attach to a network.

3. The method of claim 1, wherein the request message further indicates a request to perform a tracking area update.

4. The method of claim 1, wherein the transmission rate is based on at least one of a parameter received from the WTRU or a network condition.

5. The method of claim 1, wherein the method further comprises receiving a third message from the network node, wherein the third message indicates an acknowledgment (ACK) message, and wherein the ACK message indicates one or more sequence numbers associated with the additional user data.

6. The method of claim 1, wherein the method further comprises receiving a third message from the network node if the additional user data causes the transmission rate to be exceeded, wherein the third message indicates a non-acknowledgment (NACK).

7. The method of claim 1, wherein a control plane message from the number of control plane messages indicates release assistance information.

8. The method of claim 7, wherein the release assistance information indicates that the WTRU expects a downlink data transmission.

9. The method of claim 7, wherein the release assistance information indicates whether the WTRU expects a downlink data transmission in response to the additional user data.

10. A wireless transmit/receive unit (WTRU), the WTRU comprising:
    a processor, the processor configured to:
        receive a first message from a network node, wherein the first message indicates a transmission rate, and wherein the transmission rate indicates a maximum number of control plane messages that the WTRU can use to send user data during a first duration of time;
        send a request message to the network node, wherein the request message comprises user data and indicates that user data is to be sent via a control plane;
        receive a second message from the network node, wherein the second message comprises a back-off timer value indicating a second duration of time for the WTRU to wait before sending additional user data to the network node, and wherein the second message indicates that a service request procedure has been completed; and
        on condition that the second duration of time has elapsed, send the additional user data to the network node within the first duration of time using a number of control plane messages that is less than or equal to the maximum number of control plane messages.

11. The WTRU of claim 10, wherein the processor is further configured to send a third message to the network node, wherein a third message indicates that the WTRU has requested to attach to a network.

12. The WTRU of claim 10, wherein the request message further indicates a request to perform a tracking area update.

13. The WTRU of claim 10, wherein the transmission rate is based on at least one of a parameter received from the WTRU or a network condition.

14. The WTRU of claim 10, wherein the processor is further configured to receive a third message from the network node, wherein the third message indicates an acknowledgment (ACK) message, and wherein the ACK message indicates one or more sequence numbers associated with the additional user data.

15. The WTRU of claim 10, wherein the processor is further configured to receive a third message from the network node if the additional user data causes the transmission rate to be exceeded, wherein the third message indicates a non-acknowledgment (NACK).

16. The WTRU of claim 10, wherein a control plane message from the number of control plane messages indicates release assistance information.

17. The WTRU of claim 16, wherein the release assistance information indicates that the WTRU expects a downlink data transmission.

18. The WTRU of claim 16, wherein the release assistance information indicates whether the WTRU expects a downlink data transmission in response to the additional user data.

19. A wireless transmit/receive unit (WTRU) for sending data, the WTRU comprising:
   a processor, the processor configured to:
      receive a first message from a network node, wherein the first message indicates a transmission rate, and wherein the transmission rate indicates a maximum number of control plane messages that the WTRU can use to send user data during a first duration of time;
      send a request message to the network node, wherein the request message comprises the user data and indicates that additional user data is to be sent via a control plane;
      receive a second message from the network node, wherein the second message comprises a back-off timer value indicating a second duration of time for the WTRU to wait before sending additional user data to the network node, and wherein the second message indicates that the control plane has been established for the WTRU; and
      on condition that the second duration of time has elapsed, send the additional user data to the network node within the first duration of time using a number of control plane messages that is less than or equal to the maximum number of control plane messages.

* * * * *